United States Patent [19]

Norton et al.

[11] Patent Number: 5,353,223
[45] Date of Patent: Oct. 4, 1994

[54] MARINE NAVIGATION METHOD FOR GEOPHYSICAL EXPLORATION

[75] Inventors: John P. Norton; Noel D. Zinn; Phillip J. V. Rapatz, all of Houston, Tex.

[73] Assignee: Western Atlas International, Inc., Houston, Tex.

[21] Appl. No.: 967,673

[22] Filed: Oct. 26, 1992

[51] Int. Cl.$^5$ .......................... G01V 1/28; G04B 17/00
[52] U.S. Cl. ...................... 364/421; 367/40; 367/41; 367/19; 367/125; 367/130; 364/443
[58] Field of Search ............... 364/421, 433, 443, 460, 364/554, 578; 367/19, 125, 130, 40, 41

[56] References Cited

U.S. PATENT DOCUMENTS

| | | | |
|---|---|---|---|
| 4,777,628 | 10/1988 | Rietsch | 367/13 |
| 4,852,004 | 7/1989 | Manin | 364/421 |
| 4,858,202 | 8/1989 | Fitch et al. | 367/75 |
| 4,912,682 | 3/1990 | Norton, Jr. et al. | 367/19 |
| 4,970,696 | 11/1990 | Crews et al. | 367/15 |
| 5,166,905 | 11/1992 | Currie | 367/19 |

*Primary Examiner*—Thomas G. Black
*Assistant Examiner*—Susan Wieland
*Attorney, Agent, or Firm*—Paul S. Madan

[57] ABSTRACT

The present invention provides a method for on-line real-time processing of processing navigational data for determining the location of sensor and receiver points in a navigational network having a number of different types of devices. Observations from these devices are obtained using a coordinate system that follows appropriate nominal sailing lines. Outlying observations are discarded using w-statistics for the observations. Any correlated observations such as compass azimuths are uncorrelated. The uncorrelated observations are then sequentially processed in an extended sequential Kalman filter, which provides the best estimate of the station coordinates. These estimated coordinates are then used to determine the location of the source and receiver points.

8 Claims, 3 Drawing Sheets

MARINE NAVIGATION METHOD FOR GEOPHYSICAL EXPLORATION

BACKGROUND OF THE INVENTION

1. Field of the Invention

This invention relates generally to marine seismic surveying and more particularly to a method of determining the position of sources and receivers used in the seismic spread in marine geophysical surveying.

2. Background of the Invention

In marine seismic exploration, one or more streamer cables, each typically between 2000 and 5000 meters long and one or more acoustic pulse sources, usually air gun subarrays containing several individual air guns are towed behind a vessel in a body of water. Each streamer cable contains several sensors, typically hydrophones, spaced along the length of the streamer cable. During operation, the air guns are activated every few seconds to produce a shock wave or an acoustic pulse. The acoustic pulse is transmitted to the earth's substrata lying underneath the air gun. The acoustic pulse is reflected and refracted by the substrata layers back to the earth's surface and then to the sensors located in the streamer cables. These sensors detect the returning acoustic pulses and produce signals (dam) representative of such returning acoustic pulses. The dam is then processed to determine the structure of the earth below the surveyed area.

During the survey, the vessel is constantly moving along a predetermined course at a predetermined speed. Thus, the air guns and the sensors contained in the streamer cables are constantly moving while the survey is being performed. In order to accurately process the signals from the hydrophones (the dam), the location of the hydrophones and the location of the air gun subarrays must be determined at the time the air guns are activated.

To determine the positions of the sources and the receivers, it is typical to use a network containing a large number of different types of navigational devices. These navigational devices are placed at known locations along the streamer cable, on the air gun subarrays, on the vessel and at various other locations on various other equipment used for performing geophysical surveying. The placement of the navigational devices form a complex network which provides many hundreds of observations.

In recent years, more and more surveys are being done to obtain three-dimensional (3-D) mapping of the earth's substrata. Additionally, larger vessels using several streamer cables and air gun subarrays and multiple vessels are now routinely used for performing geophysical surveys. Use of such surveying methods requires more accurately determining the positions of the sources and receivers than has been done in the past.

To obtain more accurate positions of the sources and receivers, the trend in the industry has been to use an increasingly complex network of stations consequently increasing the number of observations by several folds.

Experience has shown that errant measurements (observations) are quite common and that if not corrected, can reduce the quality of the results obtained by processing such data. Various methods have been employed in the prior art to process the observations in real time on-board the seismic vessel. However, due to the increased complexity of the networks used, the diversity and sheer number of observations, these prior art techniques do not provide the desired accuracy, partially due to their inability to correct the errant measurements.

The present invention provides an on-line, real-time method for processing navigational observations for computing more accurate locations of the source and receiver points.

SUMMARY OF THE INVENTION

The present invention provides a method for determining the location of sensor and receiver points in a navigational network having a number of different types of devices. Observations from these devices are obtained using a coordinate system that follows appropriate nominal sailing lines. The w-statistics for the observations are computed to discard observations which fall outside the norm for those observations. Any correlated observations are uncorrelated. The uncorrelated observations are then sequentially processed in an extended sequential Kalman filter, which provides the corrected or estimated values of the observations. These estimated values are then used to determine the location of the source and receiver points.

Examples of the more important features of the method of the invention have been summarized rather broadly in order that the detailed description thereof that follows may be better understood, and in order that the contribution to the art may be better appreciated. There are, of course, additional features of the invention that will be described hereinafter and which will form the subject matter of the claims appended hereto.

BRIEF DESCRIPTION OF THE DRAWINGS

For detailed understanding of the present invention, references should be made to the following embodiment, taken in conjunction with the accompanying drawings, in which like elements have been given like numerals and wherein.

DESCRIPTION OF THE PREFERRED EMBODIMENT

The present invention provides a method for computing in real time the positions of source and receiver points in a navigational network using diversified navigational devices. The method utilizes sequential processing of connected uncorrelated observations (innovations) in the order they are received to determine the location of source and receiver points.

Figure 1:
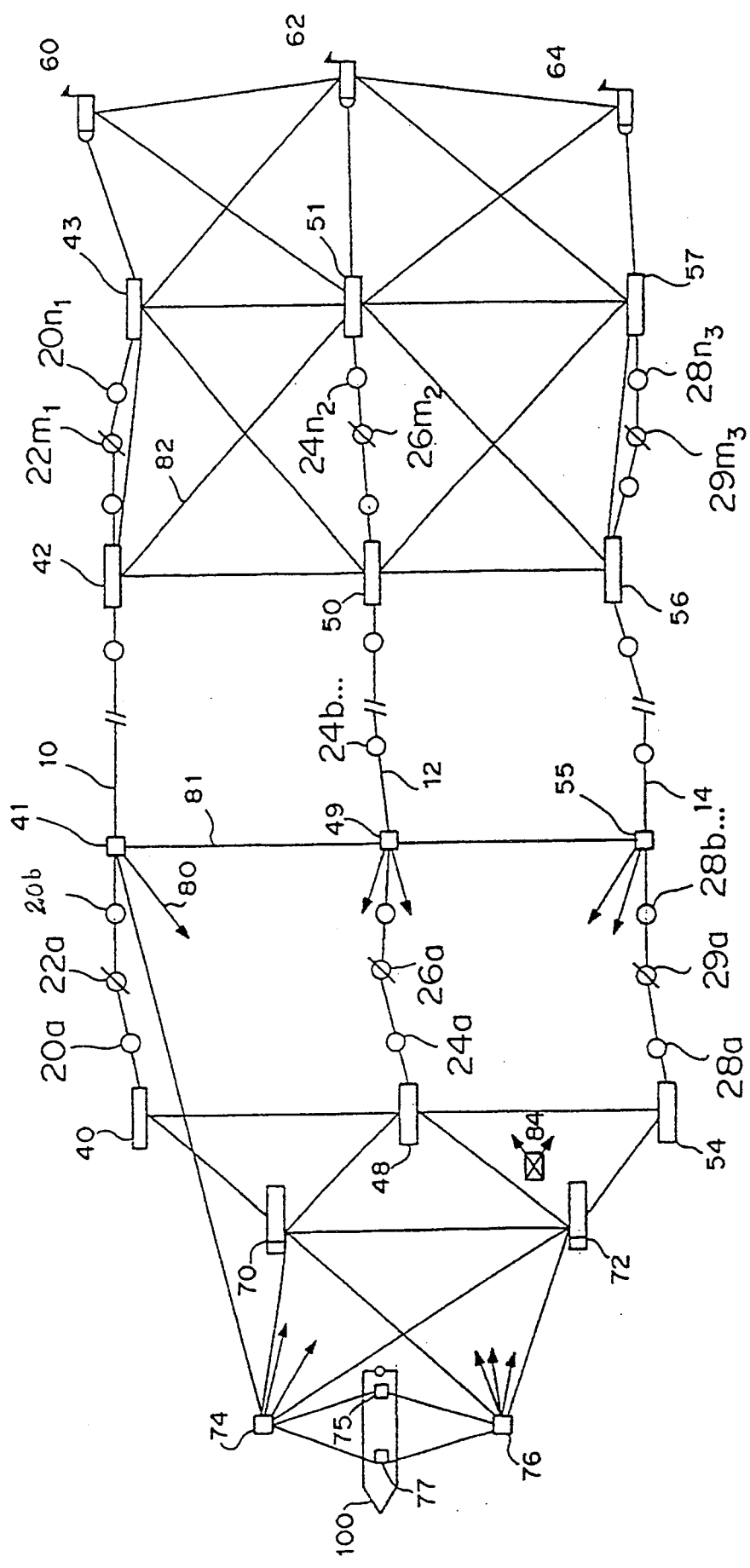
FIG. 1 shows a network of stations, sources and receivers.

FIG. 1 shows a typical network of stations, source points, receiver points and certain ranges between certain of the stations. This figure shows a placement of three streamer cables 10, 12 and 14 and two air gun sub-arrays 70 and 72 behind a vessel 100. Each air gun subarray contains several individual air guns typically forming a single source point. Each streamer cable contains a number of receivers (hydrophones) placed along the length of the cable. These hydrophones or groups of hydrophones form receiver points. Cable compasses are placed along the streamer cables to provide tangential azimuths at these locations. FIG. 1 shows cable compasses $22a \ldots 22m_1$ for cable 10, $26a$ .

...$26m_2$ for cable 12 and compasses $29a$ ... $29m_3$ for cable 14. In streamer cable 10, the receiver points are shown by $20a, 20b, ... 20n_1$. Similarly, streamer cable 12 has receiver points $24a, 24b ... 24n_2$ and streamer cable 14 has receiver points $28a, 28b ... 28n_3$. These streamer cables may or may not have the same number of receiver points.

Still referring to FIG. 1, elements 40, 42 and 43 represent stations along the streamer cable 10, each station having a desired transducer for receiving and/or transmitting desired signals. Cables 12 and 14 have similar transducer stations represented by elements 48–51 for streamer cable 12 and 54–57 for cable 14. The number of such stations is a matter of design choice. The network of FIG. 1 also contains a forward buoy 84, which contains transducers for receiving and transmitting signals. Also, each streamer cable has a tail buoy shown by elements 60, 62 and 64 at or near the end of each such streamer cable for receiving and transmitting signals. Navigation positioning satellites and/or on-shore transmitters (not shown) are commonly used to transmit signals to certain receivers in the network, such as those on the buoys and other transducers placed on the vessel. Elements 74 and 76 are additional sensors placed in the water at known locations while elements 75 and 77 are transducers on the vessel 100. The line 81 between stations 41 and 49 represents the range (distance) between those stations. Other lines such as 82, the unnumbered lines and the ones with arrows represent ranges between their respective stations.

It should be noted that FIG. 1 is presented to merely show a rudimentary network containing some of the important elements used in a typical navigational network for determining the location of the source and receiver points. Still from FIG. 1, it should be obvious that navigational networks contain source points, receiver points, several tens of stations, and as many as several hundred observations. The network, like that shown in FIG. 1, provides information that is used in the method of the present invention to accurately determine the location of the source and receiver points.

The stations as described above in reference to FIG. 1 form the basic elements of the navigation network. They typically pertain to the coordinates of a device, such as an acoustic node or a cable compass or a surface reference like a tail buoy. The stations are used as points or nodes for determining the locations of the source and receiver points. The coordinates of these points are adjusted to provide the best fit to the measurements. In many cases, the stations themselves do not directly provide the measurements but are linked to other stations. Acoustic range measurements are an example of such a condition.

Figure 2:
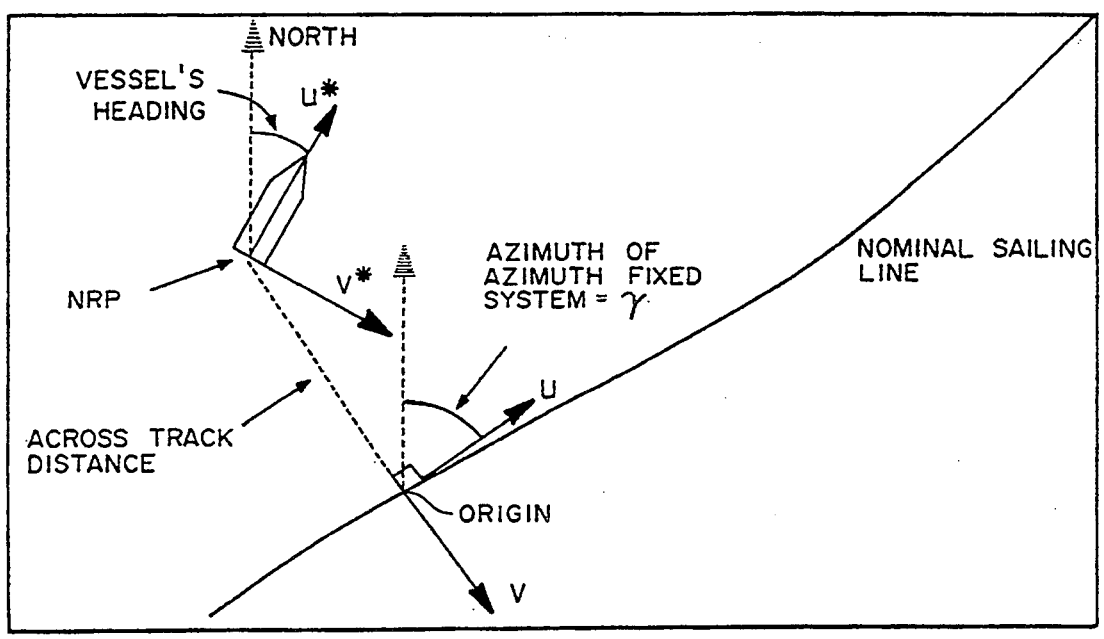
FIG. 2 shows a graphical representation of a coordinate system for use in the method of the invention.

Thus far a typical stationary network of stations has been described. However, in operation the stations are in constant motion. With an appropriate choice of a coordinate frame absolute motion of the stations can be frozen. FIG. 2 shows a coordinate system having an origin at the perpendicular projection of the vessel's navigation reference point onto the survey line (nominal track). The axes of this coordinate system are represented by u and v. The orientation of the coordinate frame of FIG. 2 is the instantaneous azimuth of the survey line at the origin point. Here, the coordinate Frame freezes the absolute motion of the described network. Only relative motion remains.

The result of using the many different types of devices in the network is a set of observations. An observation may be an acoustic range between two stations, a cable compass azimuth, the coordinates of a station or any other useful measurement obtained from the network. Observations are expressed in their appropriate units of measurement. The method of the invention utilizes the observations obtained from the network to determine the positions of the sources and the receivers.

Kalman filtering, a well known technique, is frequently used in processing observations to obtain a best estimate of sensor and receiver positions in a navigational system. Uncorrelated observations can be sequentially processed in an appropriately modified Kalman filter. However, correlated observations, especially chord azimuths derived from magnetic compass azimuths cannot be sequentially processed in a Kalman filter.

Figure 3:
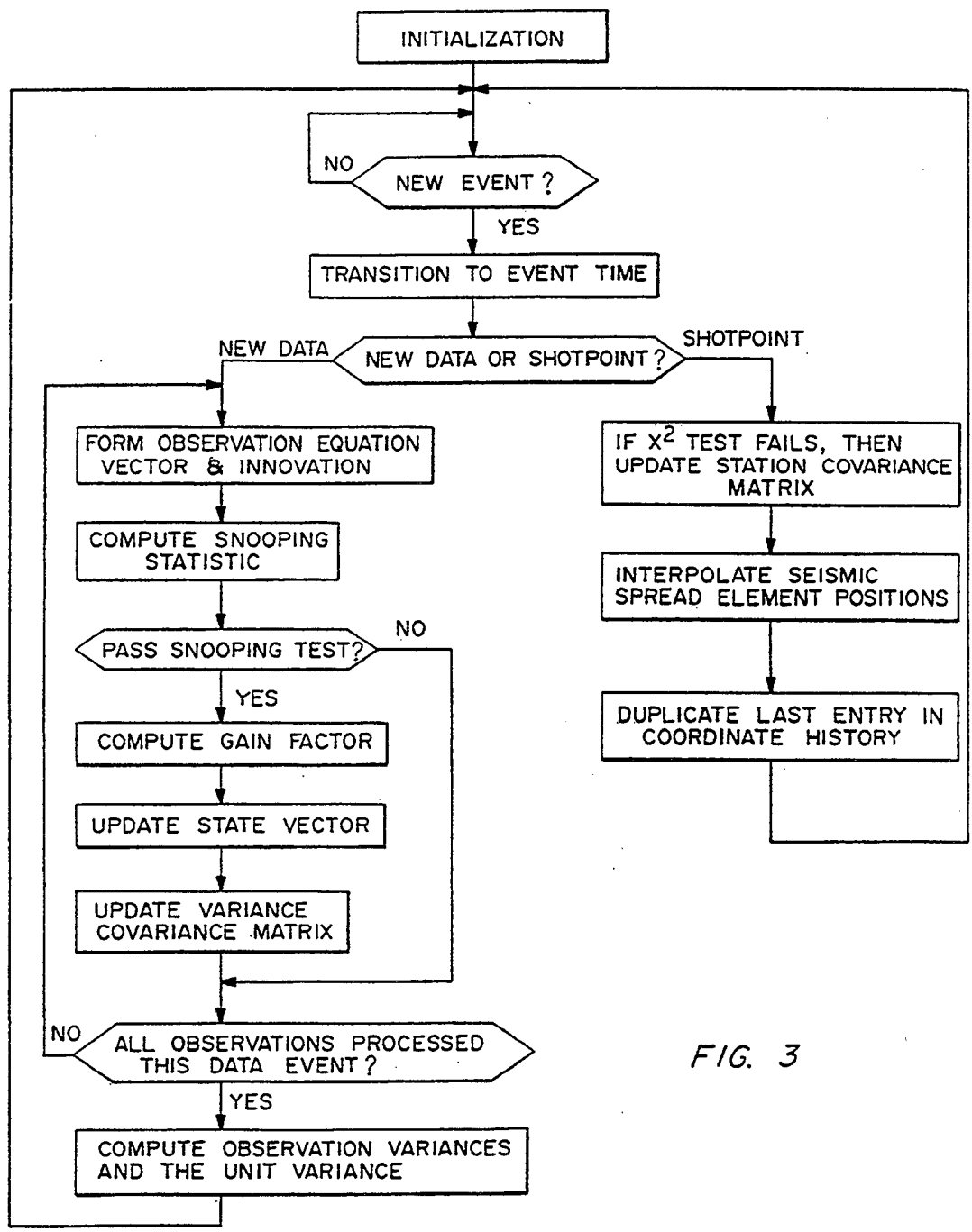
FIG. 3 shows a flow diagram of containing certain steps used in the method of the present invention.

The present invention provides a method for sequentially processing all observations obtained from the network in a Kalman filter in the order they are received to determine the positions of the source and the receiver points. The sequential processing of all observations provides computational efficiency and numerical stability over non-sequential methods. This method allows mixing of different observations during processing, which means that magnetic compasses and other sensors may be placed anywhere in the network. This allows greater design flexibility respecting the use and placement of various sensors in the network. The method of the invention will now be described while referring to FIG. 3, which is a simplified flow diagram containing the method steps.

The model used in the method of this invention utilizes a transition (or system) equation and an observation equation. The transition equation used is a linear equation and is given by:

$$\chi_{k/k-1} = F(\delta)\chi_{k-1} + T(\delta)\delta$$

where x is a state column vector of dimensions 2 n by 1 consisting of n station coordinates. $F(\delta)$ is the state vector transition matrix for interval $\delta$ and $T(\delta)$ is the state noise transition matrix for interval $\delta$. The k/k−1 subscript indicates that the state vector x has been transitioned forward in time by $F(\delta)$ and $T(\delta)$. When measurements are processed in time k, and when x is a function of those measurements, then k/k−1 subscript becomes k. As the time moves on to the next event, the k subscript becomes k−1.

The observation (or measurement) equation used is a nonlinear equation and is given by:

$$z_k = h(\chi_k) + r$$

where z is the numeric value of an observation, such as a range, an azimuth, a direct position measurement, etc., h is a nonlinear function of some elements of the state vector that predicts z, and q is the state noise. r represents the vector of the zero-mean, white noise vector of the observations and, in the case of the sequential processing of the present method, r is a scalar that pertains to a particular observation.

An initial step in the method of the invention is to estimate the variance of each observation, which may be done by using well known linear regression techniques using several prior measurements of that observation. Utilizing the variance of the observations, the variance of the innovation is determined. This yields a diagonal variance-covariance matrix, represented herein by R. An innovation is the difference between the actual (or measured) value of an observation and the predicted value of that observation. The innovation variance $\hat{\sigma}^2_{inn}$ is obtained by utilizing the following:

$$\hat{\sigma}_{inn}^2 = H P_{k/k-1} H^T + R$$

where H is the Jacobian matrix that linearizes h(x), P is the variance-covariance matrix of the state vector x and R is the variance-covariance matrix of the observations. The row vector H is computed by:

$$H = \frac{\partial}{\partial x} h(x) | x_{k/k-1}$$

The matrix P is theoretically defined by:

$$P = E[xx^T]$$

where E is the statistical expectation operator and T represents the transpose function.

Typically, in the prior art, a diagonal variance-covariance matrix is used to initialize the state variance-covariance matrix P. Such a diagonal variance-covariance matrix has been found to be inadequate for initializing the sequential Kalman filter. It is necessary to determine a fully populated P matrix to initialize the sequential Kalman filter. In the present invention, this is done by sequentially processing a full set of possible observations within the network while updating the variance-covariance matrix P and by not updating the state vector x. After startup, the P matrix and the state vector x are updated as usual within the Kalman filter.

Since the network contains several different observation types, such as acoustic ranges, chord azimuths from cable compasses, true azimuths, direct and relative longitude and latitude positions, different equations are used for different observation types to determine the Jacobian matrix H. The prior art provides techniques (equations) for various types of observations which allows for sequential processing of such observations. However, prior art methods have not provided means by which chord azimuths derived from compass observations could be processed sequentially, which has required nonsequential processing of such observations. The present invention provides a decorrelation technique which allows sequential processing of chord azimuth observations, like all the other observation types, while maintaining correct error propagation characteristics.

The chord azimuths are obtained from magnetic compasses, typically installed on the streamer cables. As is well known in the art, the chord azimuths are correlated and thus must be uncorrelated before they can be sequentially processed in a Kalman filter.

The decorrelation equations used for chord azimuths are as follows:

Assume that there are compasses 1 and 2, and that the acoustic nodes are N and M. The distance between 1 and N is a, between N and M is b, and between M and 2 is c, so that a+b+c=h. The cable tangent azimuths are given by:

$$\alpha_1 = \alpha_1$$

$$\alpha_N = \frac{b+c}{h} \alpha_1 + \frac{a}{h} \alpha_2$$

$$\alpha_M = \frac{c}{h} \alpha_1 + \frac{a+b}{h} \alpha_2$$

$$\alpha_2 = \alpha_2$$

The chord azimuths are given by:

$$\alpha_{1N} = \frac{a+2b+c}{h} \alpha_1 + \frac{a}{2h} \alpha_2$$

$$\alpha_{NM} = \frac{b+2c}{2h} \alpha_1 + \frac{2a+b}{2h} \alpha_2$$

$$\alpha_{M2} = \frac{c}{2h} \alpha_1 + \frac{2a+2b+c}{2h} \alpha_2$$

The chord azimuth variances are given by:

$$\sigma^2_{\alpha 1N} = \frac{h}{a} \frac{(\sigma^2_{\alpha 1} + \sigma^2_{\alpha 2})}{2}$$

$$\sigma^2_{\alpha NM} = \frac{h}{b} \frac{(\sigma^2_{\alpha 1} + \sigma^2_{\alpha 2})}{2}$$

$$\sigma^2_{\alpha M2} = \frac{h}{c} \frac{(\sigma^2_{\alpha 1} + \sigma^2_{\alpha 2})}{2}$$

The chord distances are given by:

$$C_{1N} = a \left( 1 - \frac{(\alpha_N - \alpha_1)^2}{24} \right)^2$$

$$C_{NM} = b \left( 1 - \frac{(\alpha_M - \alpha_N)^2}{24} \right)^2$$

$$C_{M2} = c \left( 1 - \frac{(\alpha_2 - \alpha_M)^2}{24} \right)^2$$

The chord distance variances are given by:

$$\sigma^2_{C1N} = \frac{a}{h} (d)^2$$

$$\sigma^2_{CNM} = \frac{b}{h} (d)^2$$

$$\sigma^2_{CM2} = \frac{c}{h} (d)^2$$

where d is an empirically obtained constant.

As can be seen, the above derivations will provide uncorrelated chord distances and azimuth observations, which may be sequentially processed in the Kalman filter. It is important to note that the equations given above provide for realistic and appropriate error propagation.

The data snooping statistic (also called w-statistic) is then computed for each observation to discard the outlying observations, i.e., observations which are found to be outside a predetermined norm. The method of the invention utilizes the w-statistic described by W. Baarda, in a paper entitled "A Testing for Use in Geodetic Networks," Netherlands Geodetic Commission, 1968, as modified by Teunissen et al., in a paper entitled "Performance Analysis of Kalman Filters," Delft University of Technology, 1988. The elements required to compute the w-statistic for an observation are the innovation of that observation and the estimated variance of that innovation. The w-statistic is the ratio of the innovation to the square root of its estimated variance, i.e., the normalized innovation. The mathematical relations used to compute the w-statistic are given below:

$$inn = z_k - h(x_{k/k-1})$$

$$\hat{\sigma}_{inn}^2 = HP_{k/k-1}H^T + R$$

$$\omega = \frac{inn}{\hat{\sigma}_{inn}}$$

where $inn$ is the innovation and $\sigma_{inn}$ is the standard deviation of that innovation. The remaining elements have the same meaning as described earlier.

After each observation has passed the w-statistic test, each observation is then processed in an extended sequential filter (Kalman filter). The result of this processing is the best estimate of the coordinates of all the stations within the network which may now be used to determine the location of the source and receiver points in the network by any number of well known methods, such as interpolation.

The sequential processing contains three steps. First, a gain factor or a gain matrix is determined for the Kalman filter, which is given by:

$$K = P_{k/k-1}\frac{H^T}{\sigma_{inn}^2}$$

where P is the covariance matrix of the state vector and H is the Jacobian matrix of the observation equations.

$$P=[xx^T]$$

Each innovation is then distributed over the predicted state which is represented by the transformation $$\chi_k = \chi_{k/k-1} + K \cdot inn$$

The third step involves updating the covariance matrix. The updating of the covariance matrix represents the improvement in positional accuracy afforded by the processing of an observation and the update of the state vector. Also, updating the covariance matrix after each observation is processed, and the consequent preservation of station correlations provides meaningful station accuracy reports. The covariance matrix P is updated as follows:

$$P_k = (I - KH)P_{k/k-1}$$

where I is the identity matrix.

As noted earlier, the receiver points are typically placed along the cables between known stations. The source points may be between the stations or may themselves represent stations. Thus, the positions of the source and the receiver points can be determined by interpolation techniques.

The variance-covariance scaling factor (CSF) is defined by the w-statistic over a period covered by a predetermined number of shot points and is given by:

$$\hat{\sigma}_o^2 = \frac{1}{m_2}\sum_{i=1}^{m_2} w_i^2 = CSF$$

where m is the number of observations in a predetermined number of shot points.

The CSF obtained at a shot point is then used to scale the variance-covariance matrix P for subsequent use. This has the effect of accommodating relative motion in the network.

The foregoing description is directed to a particular embodiment of the invention for the purpose of illustration and explanation. It will be apparent, however, to one skilled in the art that many modifications and changes to the embodiment set forth above axe possible without departing from the scope and the spirit of the invention. It is intended that the following claims be interpreted to embrace all such modifications and changes.

What is claimed is:

1. A method of determining the location of source and receiver points in a navigation network utilizing a set of observations obtained from the navigation network, the method comprising the steps of:
   (a) determining the variance of each observation;
   (b) uncorrelating any correlated observation;
   (c) computing a statistic or each uncorrelated observation and discarding the observations which fall outside a predetermined norm;
   (d) sequentially processing the each uncorrelated observation to obtain estimated coordinates for each station in the network; and
   (e) determining the location of the source and receiver points from the estimated station coordinates.

2. A method of processing data from a moving navigational network having a source point, a plurality of receiver points and a plurality of stations, the method comprising the steps:
   (a) obtaining a set of observations from the network stations, each observation being obtained by using a coordinate system whose origin lies along a nominal sailing line;
   (b) determining the variance of each observation;
   (c) decorrelating any correlated observation;
   (d) computing a statistic for each decorrelated observation and discarding observations which fall outside a predetermined norm;
   (e) sequentially processing each of the decorrelated observation to obtain estimated coordinates for each station int he network; and
   (f) interpolating the estimated station coordinates to determine the location of the source and receiver points.

3. A method of determining the location of seismic sources and seismic receivers contained in a marine seismic survey system utilizing a navigation network having a plurality of stations, said navigation network providing a plurality of navigational observations, certain number of such observations being correlated, the method comprising the steps of:
   (a) estimating the variance of each observation;
   (b) uncorrelating each of the correlated observations;

(c) computing innovation for each of the observations, an innovation being defined as the difference between the actual value of the observation and a predicted value for such observation;
(d) computing the variance of the innovations;
(f) computing a statistic for each observation and discarding those observations which fall outside a predetermined norm;
(g) sequentially processing the undiscarded observations to estimate the coordinates of the stations int he network; and
(h) determining the location of the source and receiver points from the estimated coordinates of the stations.

4. A method of determining the location of seismic sources and seismic receivers contained in a marine seismic survey system utilizing a navigation network having a plurality of stations and which provides a plurality of navigational observations, certain number of such observations being correlated, the method comprising the step of:
(a) estimating the variance of each observation;
(b) uncorrelating each of the correlated observations;
(c) computing an innovation for each of the observations, an innovation being defined as the difference between the actual value of the observation and a predicted value;
(d) computing the variance of the innovations;
(f) computing a statistic for each observation and discarding the observations which fall outside a predetermined norm;
(g) sequentially processing the undiscarded observations using a Kalman filter to estimate the coordinates of the stations in the network;
(h) computing a scaling factor utilizing the statics of the observations; and
(i) updating the Kalman filter by utilizing the scaling factor and using the updated Kalman filter for further processing observations.

5. A method of determining the location of seismic sources and seismic receivers contained in a marine seismic survey system utilizing a navigation network having a plurality of stations and which provide a plurality of navigational observations, certain number of such observations being correlated, the method comprising the step of:
(a) estimating the variance of each observation;
(b) uncorrelating each of the correlated observations;
(c) computing a w-statistic for each uncorrelated observation and discarding observations which fall outside a predetermined norm;
(d) sequentially processing each undiscarded uncorrelated observation to obtain the coordinates of each station in the network; and
(e) interpolating the station coordinates to determine the location of the source and receiver points.

6. In a marine seismic survey system having a source point, a plurality of receivers and a navigation network, said navigation network containing a plurality of stations and providing a plurality of observations, a method for on-line determining the location of the at lest one source and the receivers in said plurality of receivers when the seismic survey system is being towed behind a vessel, said method comprising the steps of:
(a) estimating the variance of each of the observations;
(b) uncorrelating any correlated observations in said plurality of observations;
(c) computing innovation for each of the observations, an innovation being defined as the difference between the actual value of the observation and its predicted value;
(d) computing the variance of the innovation;
(f) computing a snooping or w-statistic for each said observation and discarding those observations which fall outside a predetermined norm;
(g) sequentially processing the undiscarded observations to obtain the coordinates of the stations in the network; and
(h) determining the locations of the at lest one source and the receivers in said plurality of receivers using from the location of the stations;
(i) determining scaling factor at the at least one source point over a period of covered by a predetermined elapsed time; and
(j) updating the Kalman filter by using the scaling factor for processing subsequent observations.

7. In a marine seismic survey system having a source point, a plurality of receivers and a navigation network, said navigation network containing a plurality of stations and providing a plurality of observations, a method for on-line determining the location of the at least one source and the receivers in said plurality of receivers when the seismic survey system is being towed behind a vessel, said method comprising the steps of:
(a) estimating the variance of the observations in said plurality of observations;
(b) uncorrelating any correlated observations in said plurality of observations;
(c) computing innovation for each of the observations in said plurality of observations, an innovation for each of the observations in said plurality of observations, an innovation being defined as the difference between the actual value of the observation and a predicted value for such observation;
(d) computing the variance of the innovations;
(f) computing a snooping or w-statistic for each said observation and discarding those observations which fall outside a predetermined norm;
(g) sequentially processing the undiscarded observations using a Kalman filter to estimate the coordinates of the stations in the network; and
(h) determining the locations of the source and the receivers in said plurality of receivers using the location of the stations;
(i) determining a scaling factor using the w-statistics; and
(j) updating the Kalman filter by using the scaling factor for processing subsequent observations.

8. The method of claim 7 wherein the sequentially processing of the observations is done by using the equation $$\hat{\sigma}^2 = HP_{k/k-1}H^T + R$$

where H is a Jacobian matrix, P is the variance-covariance matrix of the state vector of the coordinates of the stations, and R is the variance-covariance matrix of the observations.

* * * * *